No. 658,353. Patented Sept. 25, 1900.
A. DUNBAR.
MACHINE FOR DRESSING STAVES.
(Application filed Oct. 16, 1899.)
(No Model.)
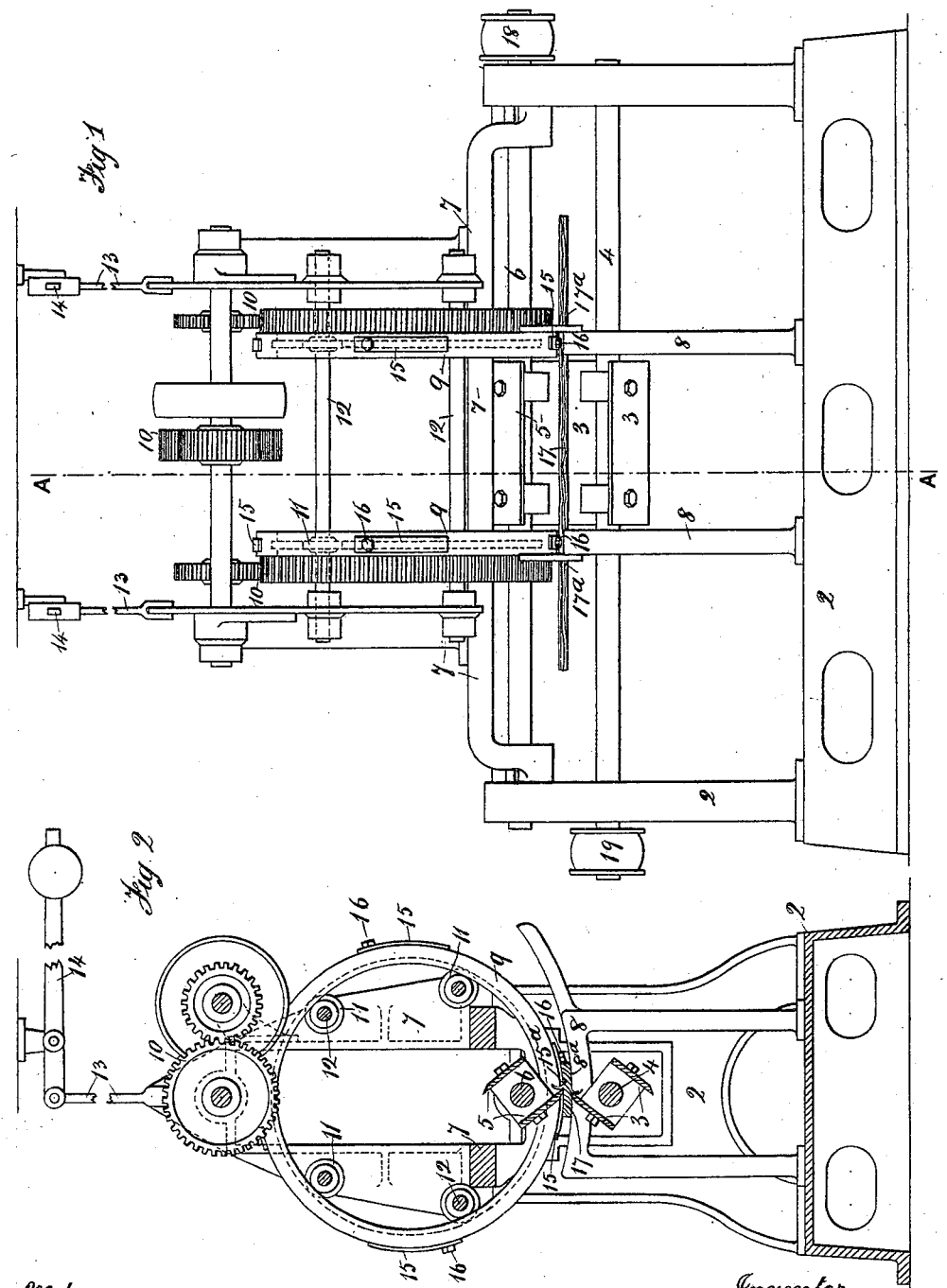
Witnesses
W. B. Johnson
A. E. Dennit
Inventor
Alexander Dunbar

UNITED STATES PATENT OFFICE.

ALEXANDER DUNBAR, OF LIVERPOOL, ENGLAND.

MACHINE FOR DRESSING STAVES.

SPECIFICATION forming part of Letters Patent No. 658,353, dated September 25, 1900.

Application filed October 16, 1899. Serial No. 733,816. (No model.)

*To all whom it may concern:*

Be it known that I, ALEXANDER DUNBAR, a subject of the Queen of Great Britain, residing at Liverpool, in the county of Lancaster, England, have invented new and useful Improvements in Machines for Planing, Trimming, or Dressing Staves for Casks, of which the following is a specification, reference being had to the accompanying drawings, in which—

Figure 1 is a front elevation, and Fig. 2 is a vertical section at the line A A on Fig. 1.

This invention relates more particularly to machines for backing and hollowing staves—that is, cutting or dressing the staves slightly concave on one side and convex on the other, although it may be modified to adapt it for flat staves.

The object of the invention is to provide a machine for dressing the central part of a stave when the end portions have already been dressed to the desired form in a separate machine. It is specially applicable to dressing what are known as "riven staves," which are naturally twisted; and it consists, essentially, in causing the stave to pass between specially-arranged guides which bear on the already-dressed portions, while at the same time cutters with their edges arranged level with the surfaces of the guides cut away the undressed portions of the stave level or nearly so, with the end portions.

Referring to the drawings, 2 is the main frame.

3 indicates the lower rotating cutters, secured on a shaft 4, carried in bearings on the frame 2.

5 indicates the upper rotating cutters, secured on a shaft 6, carried in bearings on a vertically-movable frame 7.

8 indicates stationary guides secured to the frame 2.

9 indicates rotary guides for feeding the staves between the cutters.

10 is a spur-wheel gear for rotating the guides 9. The rotary guides 9 are supported by and revolve on antifriction-rollers 11, carried on shafts 12, supported in bearings on the frame 7. The frame 7 is attached by rods 13 to weighted levers 14, which partly counterbalance the weight of the frame and its attached mechanism.

15 indicates facing-pieces on the guides 9, which bear against the top surface of the staves and by the weight of the frame 7 and attached mechanism keep such staves pressed against the lower guides 8 when the staves are passing between the cutters.

16 indicates projections on the guides 9, whereby the staves are pushed through between the cutters. 17 is a stave being passed through. The lower cutters are so adjusted that their cutting edges are level with the face $8^a$ of the stationary guides 8 at the center line, and the upper cutters are adjusted so that their cutting edges are level with the faces of the facing-pieces 15 at $15^a$. The cutters are driven through the pulleys 18 19 by any suitable arrangement of belting, as usual.

The action is as follows: A stave which has had the end portions $17^a$ dressed to the required form, say, in a separate machine is placed with its dressed portions on the guides 8, and as the guides 9 rotate the projections 16 carry the stave between the cutters, the facing-pieces 15 on the guides 9 pressing the stave closely against the guides 8. By reason of the dressed portions of the stave resting against the guides 8 and the facing-pieces 15 on the guides 9 and the edges of the cutters being adjusted level therewith the central portion of the stave is dressed level with the previously-dressed end portions.

I claim—

1. In stave-dressing machinery, the combination with mechanism for feeding a stave transversely of its length, of end guides movable toward and from the stave and arranged to press yieldingly thereon, and a cutter between the guides arranged to move with the movement of the guides; substantially as described.

2. In stave-dressing machinery, the combination of stationary end supports arranged to support a stave by its dressed end portions, and a vertically-movable frame above the stationary guides and carrying upper guides arranged to press upon the end portions of the stave and also a cutter arranged to act upon the intermediate portion of the stave; substantially as described.

3. In stave-dressing machinery, the combination with stationary guides, of a vertically-movable frame carrying rotary guides and a feeder for the stave, and having also a cutter mounted thereon; substantially as described.

4. In stave-dressing machinery, a support for the stave, a frame movable toward and from said support, and having pressers thereon, rotary feeders mounted on the frame and arranged to feed the stave transversely of its length, and a rotary cutter also mounted on the movable frame; substantially as described.

ALEXANDER DUNBAR.

Witnesses:
W. B. JOHNSON,
H. E. DANNIT.